(12) United States Patent
Falcone

(10) Patent No.: US 11,745,554 B2
(45) Date of Patent: Sep. 5, 2023

(54) TAILLIGHT ENHANCEMENT HARNESS FOR A TOWED VEHICLE

(71) Applicant: Nicholas Joseph Falcone, Muncie, IN (US)

(72) Inventor: Nicholas Joseph Falcone, Muncie, IN (US)

( * ) Notice: Subject to any disclaimer, the term of this patent is extended or adjusted under 35 U.S.C. 154(b) by 274 days.

(21) Appl. No.: 16/949,427

(22) Filed: Oct. 29, 2020

(65) Prior Publication Data

US 2021/0122202 A1 Apr. 29, 2021

Related U.S. Application Data

(60) Provisional application No. 62/927,265, filed on Oct. 29, 2019.

(51) Int. Cl.

| | |
|---|---|
| *B60D 1/64* | (2006.01) |
| *B60Q 1/30* | (2006.01) |
| *B60Q 1/00* | (2006.01) |
| *B60Q 1/26* | (2006.01) |
| *B60Q 1/44* | (2006.01) |
| *H01R 13/66* | (2006.01) |
| *B60Q 1/46* | (2006.01) |
| *F21V 23/06* | (2006.01) |
| *F21S 10/06* | (2006.01) |
| *F21V 23/00* | (2015.01) |
| *H05B 47/16* | (2020.01) |
| *B60Q 1/34* | (2006.01) |

(52) U.S. Cl.
CPC ............. *B60D 1/64* (2013.01); *B60Q 1/0094* (2013.01); *B60Q 1/2607* (2013.01); *B60Q 1/305* (2013.01); *B60Q 1/34* (2013.01); *B60Q 1/44* (2013.01); *B60Q 1/46* (2013.01); *F21S 10/06* (2013.01); *F21V 23/003* (2013.01); *F21V 23/06* (2013.01); *H01R 13/6691* (2013.01); *H05B 47/16* (2020.01); *B60Q 2900/10* (2013.01)

(58) Field of Classification Search
CPC ........ B60D 1/64; H05B 47/16; B60Q 1/0094; B60Q 1/2607; B60Q 1/305
See application file for complete search history.

(56) References Cited

U.S. PATENT DOCUMENTS

| | | |
|---|---|---|
| 3,970,860 A | 7/1976 | Purdy |
| 4,005,313 A | 1/1977 | Tibbits |
| 4,017,827 A | 4/1977 | Brodesser |
| 4,064,413 A | 12/1977 | Andersen |
| 4,270,115 A | 5/1981 | Bonnett |
| 4,325,052 A | 4/1982 | Koerner |
| 4,939,503 A | 7/1990 | Swanson |

(Continued)

*Primary Examiner* — Christopher E Dunay
(74) *Attorney, Agent, or Firm* — Dunlap Bennett & Ludwig, PLLC

(57) ABSTRACT

A taillight enhancement harness for providing a lighting enhancement to a taillight of a towed vehicle. The harness interconnects a first lighting system of a towing vehicle and a second lighting system of the towed vehicle. A lighting enhancement circuit is interposed between a first connector, configured to couple to the towing vehicle, and a second connector, configured to couple to the towed vehicle. The lighting enhancement circuit is configured to activate a taillight of the towed vehicle in a strobe operation. After a predetermined temporal period, the taillight resumes a normal indication operating mode for the taillight.

6 Claims, 4 Drawing Sheets

(56) References Cited

U.S. PATENT DOCUMENTS

| | | | |
|---|---|---|---|
| 5,389,823 | A | 2/1995 | Hopkins et al. |
| 5,521,466 | A | 5/1996 | Vincent |
| 5,739,592 | A | 4/1998 | Rigsby et al. |
| 5,760,545 | A | 6/1998 | Mikel |
| 5,854,517 | A | 12/1998 | Hines |
| 6,097,283 | A | 8/2000 | Szudarek et al. |
| 6,744,361 | B1 * | 6/2004 | Maddox .................. B60Q 1/44 |
| | | | 340/467 |
| 6,866,350 | B2 | 3/2005 | Palmer et al. |
| 8,323,036 | B2 | 12/2012 | Workman |
| 9,120,424 | B2 | 9/2015 | Motts et al. |
| 9,352,684 | B2 | 5/2016 | Barlsen et al. |
| 10,053,002 | B2 | 8/2018 | Randolph et al. |
| 2009/0311881 | A1 | 12/2009 | Dilgard |
| 2017/0313240 | A1 * | 11/2017 | Randolph ................. B60T 7/02 |
| 2019/0111899 | A1 * | 4/2019 | Lange, III ............ H01R 13/665 |
| 2020/0088777 | A1 * | 3/2020 | Marshall .............. G01R 1/0416 |
| 2020/0130566 | A1 * | 4/2020 | Albritton ............... H05B 47/10 |
| 2020/0189453 | A1 * | 6/2020 | Tucker .................... B60R 21/01 |
| 2021/0061166 | A1 * | 3/2021 | Davis .................. H04N 5/2354 |

* cited by examiner

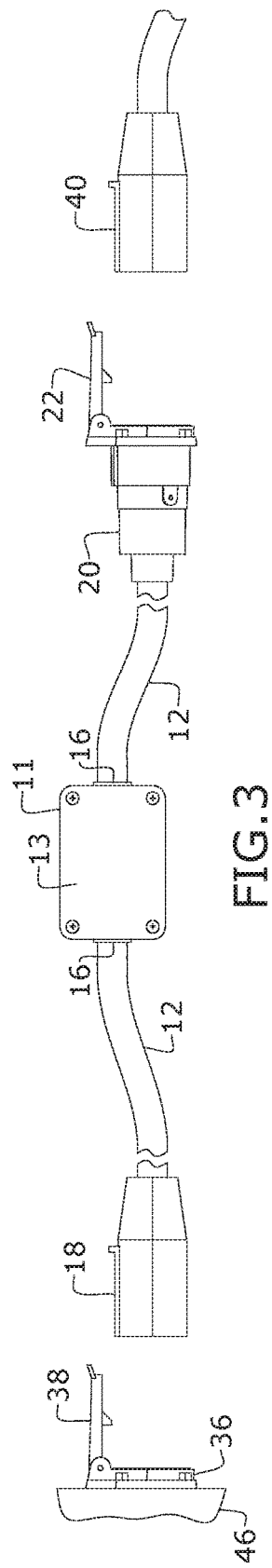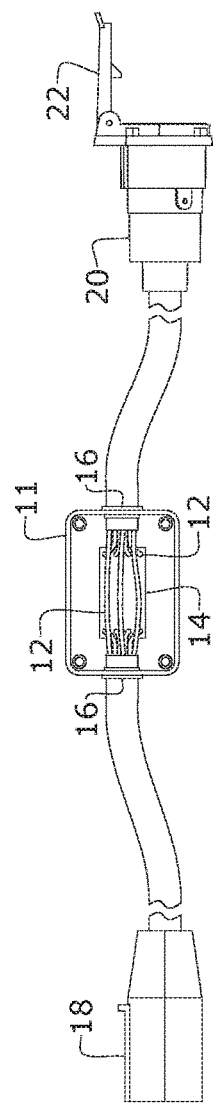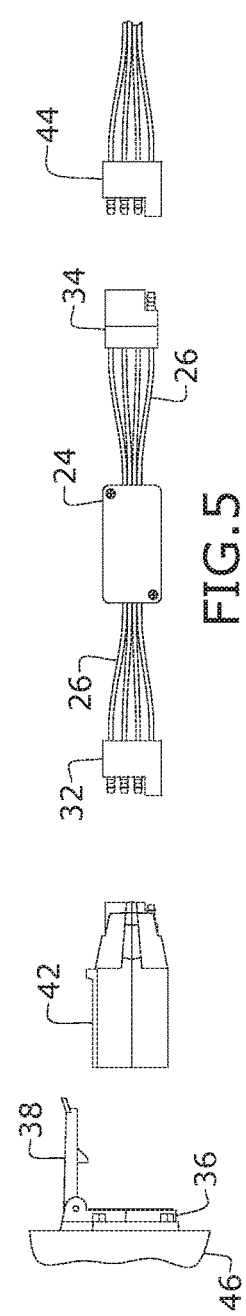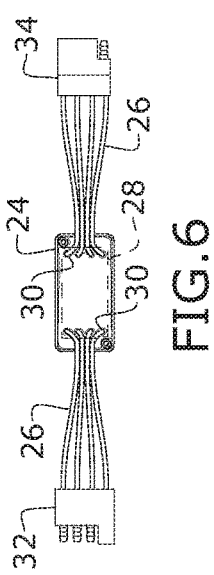
FIG. 3
FIG. 4
FIG. 5
FIG. 6

TAILLIGHT ENHANCEMENT HARNESS FOR A TOWED VEHICLE

CROSS-REFERENCE TO RELATED APPLICATION

This application claims the benefit of priority of U.S. provisional application No. 62/927,265, filed Oct. 29, 2019, the contents of which are herein incorporated by reference.

BACKGROUND OF THE INVENTION

The present invention relates to vehicle lighting systems, and more particularly to lighting systems for towed vehicles.

Today's drivers have become increasingly distracted and sometimes need help to focus on the road to avoid collisions. While many motor vehicles, such as cars and trucks, have been equipped with taillight enhancements to attract the attention of the driver of a following vehicle, such enhancements are not available for the taillights of a towed vehicle, such as a trailer.

As can be seen, there is a need for an improved vehicle lighting systems to provide visual enhancements to the taillight system of a towed vehicle.

SUMMARY OF THE INVENTION

In one aspect of the present invention, a wiring harness for electrically coupling a first lighting system of a towing vehicle with a second lighting system of a towed vehicle is disclosed. The wiring harness includes a first connector configured to electrically connect with the lighting system of the towing vehicle. A second connector is configured to electrically connect with the lighting system of the towed vehicle. A plurality of conductors extends between the first connector and the second connector. A lighting enhancement circuit is in electrical communication with at least one of the plurality of conductors. The lighting enhancement circuit is configured to impart a lighting enhancement to a taillight of the towed vehicle upon activation of a corresponding taillight of the towing vehicle.

In some embodiments, the lighting enhancement is a strobe effect. The lighting enhancement circuit activates the lighting enhancement for a predetermined temporal period prior to activating the taillight in a normal mode for the taillight.

In some embodiments, the taillight is a brake indicator light, and the brake indicator light illuminates in a steady stop indication after the predetermined temporal period. In other embodiments, the taillight is a directional indicator light and the directional indicator light flashes at a different rate after the predetermined temporal period.

In some embodiments, the lighting enhancement circuit is interposed between the first connector and the second connector.

In some embodiments, a housing containing the lighting enhancement circuit is provided. A cover plate is included to selectively open and close the housing.

In other embodiments, the lighting enhancement circuit is carried in one or more of the first connector and the second connector.

In some embodiments, the first connector is selected from the group consisting of a 7 way and a 4-way connector. Likewise, the second connector is selected from the group consisting of a 7-way and a 4-way connector.

In other aspects of the invention, a wiring harness for electrically coupling a first lighting system of a towing vehicle with a second lighting system of a towed vehicle is disclosed. The wiring harness includes a first connector configured to electrically connect with the lighting system of the towing vehicle. A second connector is configured to electrically connect with the lighting system of the towed vehicle. A lighting enhancement circuit is interposed between the first connector and the second connector. The lighting enhancement circuit is configured to impart a lighting enhancement to a taillight of the towed vehicle upon activation of a corresponding taillight of the towing vehicle and resume a normal mode of operation after a predetermined temporal period.

These and other features, aspects and advantages of the present invention will become better understood with reference to the following drawings, description and claims.

BRIEF DESCRIPTION OF THE DRAWINGS

FIG. 3 is a schematic view of a first embodiment of the lighting enhancement wiring harness.

FIG. 4 is a schematic view of the first embodiment without the housing cover plate.

FIG. 5 is a schematic view of a second embodiment of a lighting enhancement wiring harness.

FIG. 6 is a schematic view of the second embodiment without housing cover plate.

DETAILED DESCRIPTION

Figure 1:
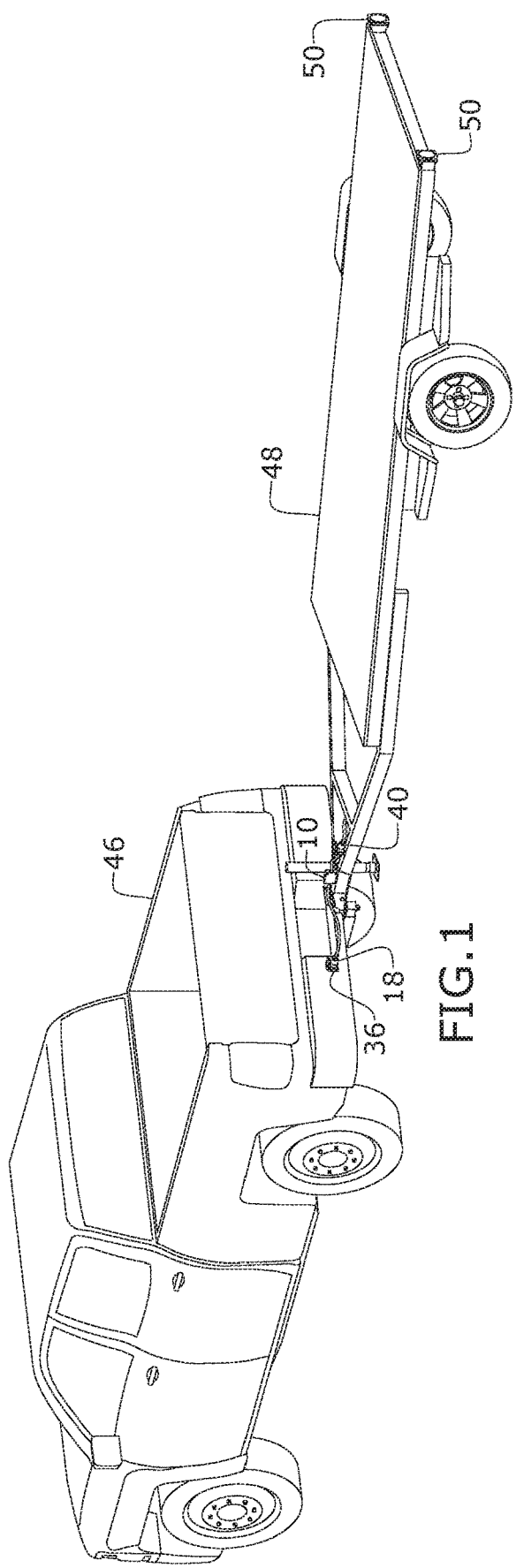
FIG. 1 is a perspective view of a lighting enhancement wiring harness shown in-use.
Figure 2:
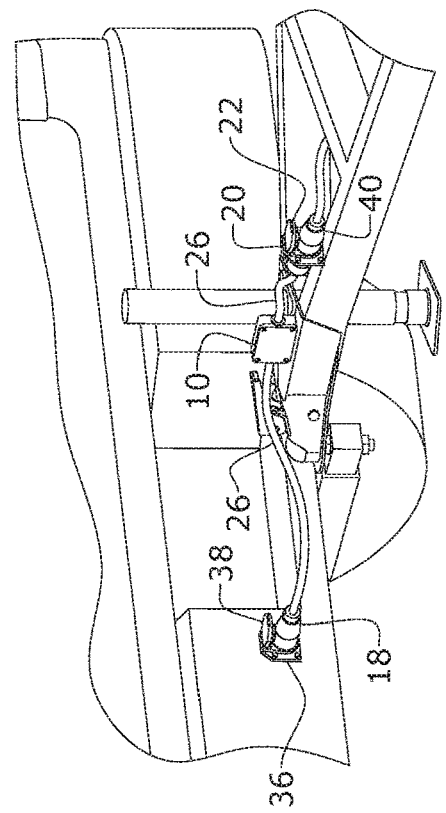
FIG. 2 is an enlarged perspective view of the a lighting enhancement wiring harness shown in-use.

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provides an improved wiring harness between a towing vehicle and a towed vehicle that imparts a taillight enhancement to the towed vehicle to alert a following driver of a change in the intended operating condition of the towed vehicle.

As seen in reference to the drawings of FIGS. 1-6, a lighting enhancement wiring harness 10 is shown to operatively interconnect the lighting system of a towing vehicle 46 with the lighting system 50 of a towed vehicle 48, such as a trailer.

The wiring harness 10 includes a plurality of conductors 12 to communicate a lighting condition of the towing vehicle 46 with a plurality of lights 50 on the towed vehicle 48. A first connector 18, 32 is provided at a first end of the wiring harness 10 and is configured to interconnect with the lighting system of the towing vehicle 46. In many instances, a first receptacle 36 is provided to interconnect the connector 18, 42, with the lighting system of the towing vehicle 46. The receptacle 36 may have a cover 38 to prevent contamination of the contacts in the receptacle 36 when not in use.

A second connector 20, 34 is provided at a second end of the wiring harness 10. The second connector 20, 34 is configured to interconnect with the lighting system 50 of the towed vehicle 48. In some instances, a second receptacle may be mounted on the towed vehicle 48. In the non-limiting embodiments shown the first connector and the second connector may be one of an "7 way" 18 or a "4-way" 32 connector that are standard connections for wiring harnesses between the towing vehicle 46 and the towed vehicle 48. An adapter 42 may also be utilized to adapt a connection between a "4-way" connector 32 to a 7-way receptacle 36. As will be appreciated from the present disclosure, the first connector and the second connector may be any suitable connector for interconnection with the towing vehicle 46 and the towed vehicle 48.

A lighting enhancement circuit 14 may be interposed between the first connector 18, 32 and the second connector 20, 34. The lighting enhancement circuit is electrically connected with a plurality of conductors 26 in the harness 10 that interconnect a selected lighting element of the towing vehicle 46 with a corresponding lighting element of the towed vehicle 48. In the non-limiting embodiment shown, the lighting enhancement circuit 14 is carried within a housing 11. A fastener 16 is provided in the housing 11 to secure the plurality of conductors 12 to the housing 11. A cover plate 13 may be provided to access the lighting enhancement circuit 14 for servicing. Alternatively, the lighting enhancement circuit 14 may be sealed within the housing 11. As will be appreciated, the lighting enhancement circuit 14 may be carried within one of the first or the second connectors.

Figure 7:
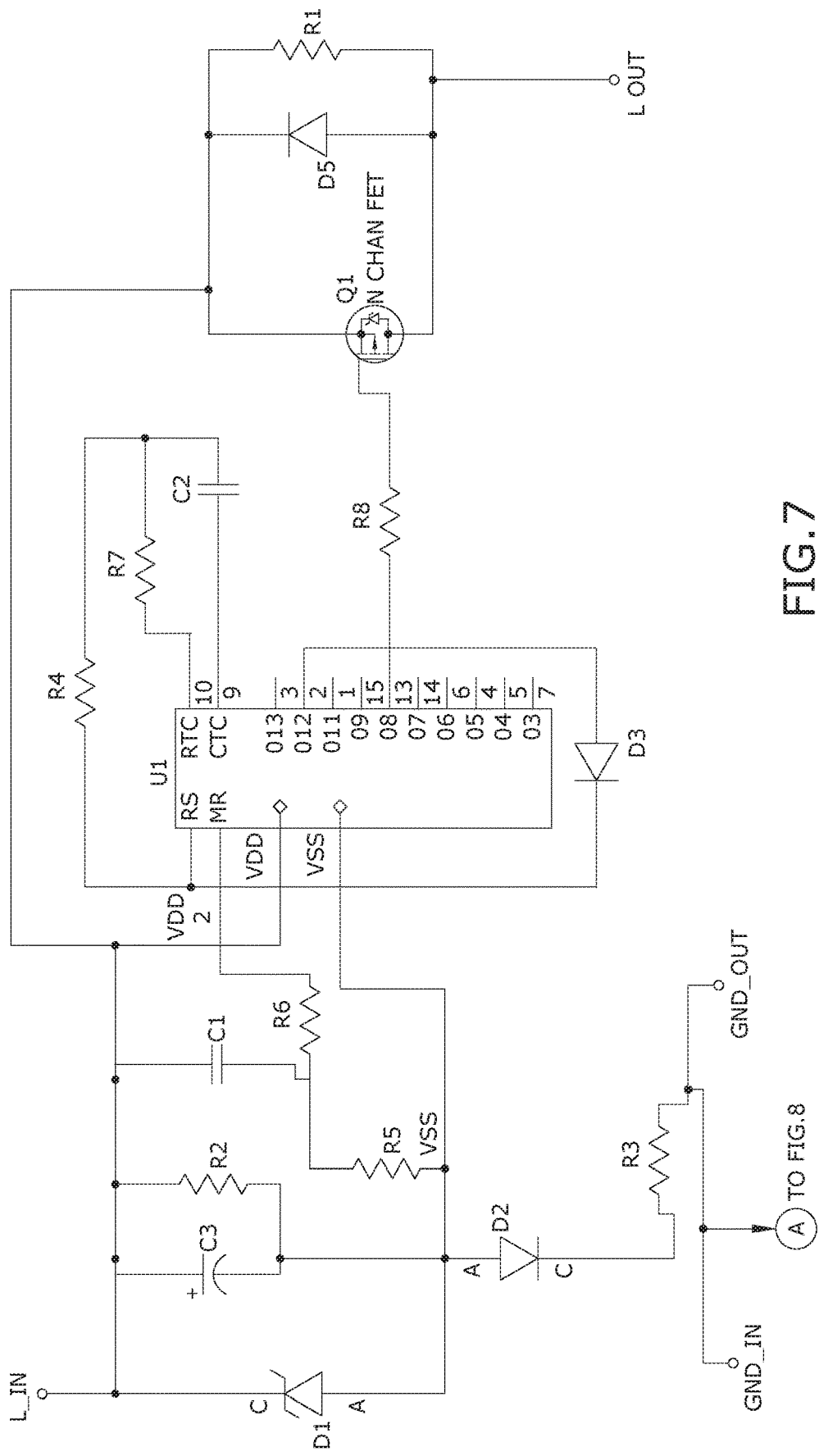
FIG. 7 is a wiring diagram of a lighting enhancement circuit.
Figure 8:
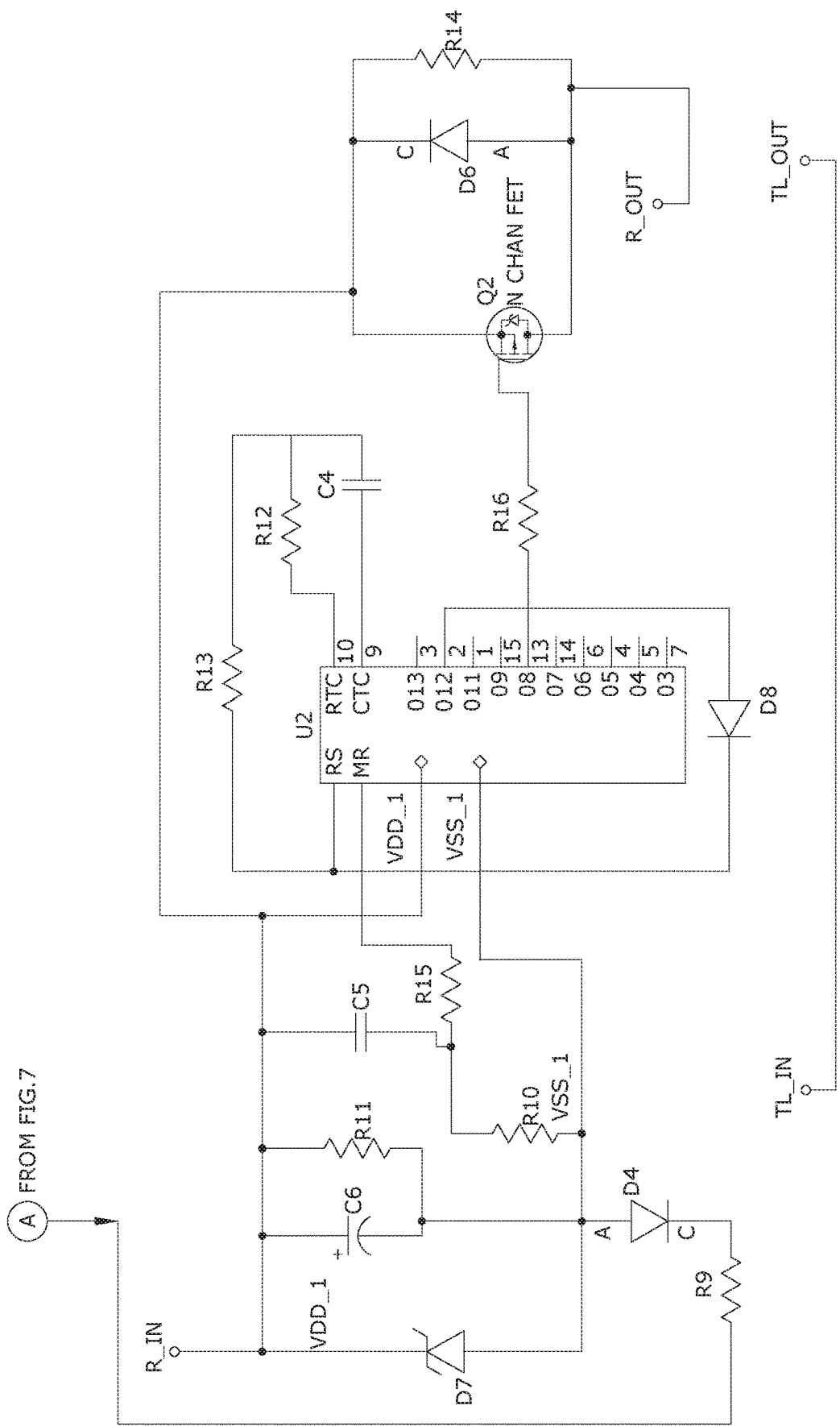
FIG. 8 is a continuation of the lighting enhancement circuit.

The lighting enhancement circuit 14 is configured to impart a selected lighting enhancement to a selected taillight 50 of the towed vehicle 48. A representative non-limiting circuitry for the lighting enhancement circuit 14 is shown in reference to FIGS. 7 and 8. The lighting enhancement provided may, for example activate the brake lights 50 of the towed vehicle with an initial strobe effect for a first temporal duration prior to activating the brake lights 50 in a steady stop indication. The initial strobe effect of the lighting enhancement can alert a following driver to a change in operation of the towing 46 and towed vehicles 48, giving the following driver faster response time and increasing the safety of everyone involved.

When the turn signals or hazard flashers are activated, the lighting enhancement circuit 14 may also impart a lighting enhancement effect to alert the following driver. The lighting enhancement effect may be the same strobing effect as the brake lights, and flash as a much faster rate, to attract the attention of the following driver that is not paying attention.

As will be appreciated, the wiring harness 10 of the present is compatible with many of today's existing trailer light systems and requires no technical skills to install. The wiring harness 10 is truly a plug and play harness, that increases the safety of operating a towing vehicle 46 with a towed vehicle 48.

It should be understood, of course, that the foregoing relates to exemplary embodiments of the invention and that modifications may be made without departing from the spirit and scope of the invention as set forth in the following claims.

What is claimed is:

1. A wiring harness for electrically coupling a first lighting system of a towing vehicle with a second lighting system of a towed vehicle, comprising:
   a first connector configured to electrically connect with the lighting system of the towing vehicle;
   a second connector configured to electrically connect with the lighting system of the towed vehicle;
   a plurality of conductors extending between the first connector and the second connector; and
   a housing containing a lighting enhancement circuit,
   wherein the lighting enhancement circuit is in electrical communication with each conductor of the plurality of conductors,
   wherein each conductor is electrically coupled to a brake light, a turning signal, and/or a hazard light of the towed vehicle,
   wherein the lighting enhancement circuit is configured to impart a lighting enhancement including at least a break light lighting enhancement, a turning signal lighting enhancement, and/or a hazard light lighting enhancement to each of the brake light, the turning signal, and the hazard light of the towed vehicle, respectively, upon activation of a corresponding break light, turning signal, and/or hazard light of the towing vehicle,
   wherein each lighting enhancement including the break light lighting enhancement, turning signal lighting enhancement, and/or the hazard light lighting enhancement is a strobe effect with a flash rate that is substantially different from each other lighting enhancement.

2. The wiring harness of claim 1, wherein the lighting enhancement circuit activates each lighting enhancement for a predetermined temporal period prior to activating the corresponding break light, turning signal, and/or hazard light taillight in a respective normal mode.

3. The wiring harness of claim 1, wherein the lighting enhancement circuit is interposed between the first connector and the second connector.

4. The wiring harness of claim 1, further comprising:
   a cover plate to selective open and close the housing.

5. The wiring harness of claim 1, wherein the first connector is selected from the group consisting of a 7 way and a 4-way connector.

6. The wiring harness of claim 1, wherein the second connector is selected from the group consisting of a 7-way and a 4-way connector.

* * * * *